(12) United States Patent
Flathers et al.

(10) Patent No.: US 7,016,479 B2
(45) Date of Patent: Mar. 21, 2006

(54) METHOD AND SYSTEM FOR CALL RESTORATION IN A VIDEO RELAY SERVICE

(75) Inventors: Michael Drew Flathers, Alpine, UT (US); Glenn Daniel Clapp, Sandy, UT (US); Edward Franz Armstrong, American Fork, UT (US); Scot Lorin Brooksby, Highland, UT (US)

(73) Assignee: Sorenson Communications, Inc., Salt Lake City, UT (US)

( * ) Notice: Subject to any disclaimer, the term of this patent is extended or adjusted under 35 U.S.C. 154(b) by 0 days.

(21) Appl. No.: 10/831,643

(22) Filed: Apr. 23, 2004

(65) Prior Publication Data

US 2005/0238144 A1    Oct. 27, 2005

(51) Int. Cl.
    *H04M 11/00*    (2006.01)
(52) U.S. Cl. ............. 379/52; 379/265.13; 379/309
(58) Field of Classification Search ............. 379/52, 379/265.01, 265.02, 265.11, 265.13, 201.01, 379/93.17, 308, 309
See application file for complete search history.

(56) References Cited

U.S. PATENT DOCUMENTS

| | | | |
|---|---|---|---|
| 5,163,081 A | 11/1992 | Wycherley et al. | |
| 5,333,133 A | 7/1994 | Andrews et al. | |
| 5,533,108 A | 7/1996 | Harris et al. | |
| 5,787,148 A | 7/1998 | August | |
| 5,926,539 A | 7/1999 | Shtivelman | |
| 5,982,853 A | 11/1999 | Liebermann | |
| 6,031,905 A | 2/2000 | Furman et al. | |
| 6,046,762 A | 4/2000 | Sonesh et al. | |
| 6,249,681 B1 | 6/2001 | Virtanen | |
| 6,389,132 B1 | 5/2002 | Price | |
| 6,477,239 B1 | 11/2002 | Ohki et al. | |
| 6,683,937 B1 | 1/2004 | Watson et al. | |
| 6,694,008 B1 | 2/2004 | Mukherji et al. | |
| 6,724,886 B1 * | 4/2004 | Watson .................. | 379/52 |
| 6,763,089 B1 * | 7/2004 | Feigenbaum ............ | 379/52 |
| 6,831,974 B1 * | 12/2004 | Watson et al. ........... | 379/52 |
| 2002/0077128 A1 | 6/2002 | Okun et al. | |

FOREIGN PATENT DOCUMENTS

| | | |
|---|---|---|
| EP | 0 821 510 A2 | 1/1998 |
| EP | 0 848 552 A1 | 6/1998 |
| WO | WO 99/14951 | 3/1999 |

* cited by examiner

*Primary Examiner*—Wing Chan
(74) *Attorney, Agent, or Firm*—TraskBritt

(57) ABSTRACT

A method and system for call restoration in a video relay service are disclosed, including a system that includes a VRS server having a call queue. The VRS server receives at least one call request to establish a communication session between a hearing-impaired user and a hearing-capable user. The VRS server also compares the call request with the plurality of call requests to identify if the call request corresponds to a previous call request corresponding to one in the call queue. The system also includes a VRS client application interactively coupled to the VRS server and configured to monitor availability of interpretive services. When the call request corresponding to the hearing-impaired user and the hearing-capable user is sorted to a top of the call queue and the interpretive services are available, the application establishes the communication session via the interpretive services between the hearing-impaired user and the hearing-capable user.

20 Claims, 5 Drawing Sheets

METHOD AND SYSTEM FOR CALL RESTORATION IN A VIDEO RELAY SERVICE

BACKGROUND OF THE INVENTION

1. Field of the Invention

The invention relates generally to call restoration in a communication system, and, more particularly, to a method and system for retaining a queuing order for interrupted calls in a communication system.

2. State of the Art

Connection-based or point-to-point calls such as traditional telephone calls, for example, over a public switched telephone network, are generally established in a real time or near real time manner. As such, the establishment of communication sessions generally does not require the formation of a queue or waiting list for the establishment of connection-based calls.

However, when a communication session requires, for example, an intermediary service, such as interpretive services for the deaf or hearing-impaired, the formation of a queue or waiting list is commonplace as call-initiating parties await the availability of interpretive services. Because of the latency of establishing a communication session, opportunities exist for the partial communication session between a calling party and an interpretive service to be interrupted, resulting in the loss of priority or position in the queue when the calling party reinitiates contact with the interpretive services.

Similarly, a channel formed between a calling party and an interpretive service provider may frequently be established over a connectionless network. Such alternative network configurations between a called party and an interpretive service may be required due to the enhanced bandwidth nature of such a connection, particularly if such a connection employs a broadband device, such as a video phone for communicating between the called party and the interpretive service. As such, a broadband network for facilitating the transfer of an enhanced bandwidth data may employ connectionless channels such as one employing Internet Protocol (IP) or other packetized connectionless technologies. It is appreciated by those of ordinary skill in the art that such connectionless based networks regularly experience dropped packets or other network interruptions that may cause the connectionless based communication link between a calling party and an interpretive service to be dropped or otherwise lost. In such an environment where a calling party assumes a position in a queue while awaiting, for example, interpretive services, the calling party would lose their position in the queue and upon subsequent reconnection would assume a more unfavorable position in the queue, namely joining the queue in the lowest priority or last position.

Therefore, in order to provide an enhanced experience for a user in a communication system where a calling party assumes a position in a queue while awaiting the completion of the establishment of a communication session, the need exists for recovering from the loss of a dropped connection during the establishment of a communication session or partial session utilizing a form of intermediary services.

BRIEF SUMMARY OF THE INVENTION

The present invention is directed to a method and system for call restoration in a video relay service. In one embodiment of the present invention, a system is provided for a video relay service (VRS) system. The system includes a VRS server, including a call queue. The VRS server is configured to receive at least one call request to establish a communication session between a hearing-impaired user and a hearing-capable user and maintain the call queue. The call queue includes a plurality of call requests with each call request including call information regarding the hearing-impaired user and the hearing-capable user. The VRS server also includes control logic configured to compare the call request with the plurality of call requests and to identify if the call request corresponds to a previous call request corresponding to one in the call queue. The system also includes a VRS client application interactively coupled to the VRS server and is configured to monitor availability of interpretive services; when the call request corresponding to the hearing-impaired user and the hearing-capable user is sorted to a top of the call queue and the interpretive services are available, the application establishes the communication session via the interpretive services between the hearing-impaired user and the hearing-capable user.

In another embodiment of the present invention, a method is provided for electronic communication with a hearing-impaired user. At least one call is received including a call request, which further includes call information regarding the hearing-impaired user and the hearing-capable user. A call queue is maintained, which comprises a plurality of call requests corresponding to a plurality of calls. The call requests each include a call record comprising a call status of a corresponding call. The call is restored according to the call status in the call queue when the call information of the at least one call matches the call record of one of the plurality of call requests in the call queue.

In another embodiment of the present invention, a method is provided for restoring an interrupted communication session between a hearing-impaired user and a hearing-capable user. A call request is received that includes call information relating to the hearing-impaired user and the hearing-capable user. The call information of the call request is compared with a plurality of call information corresponding to a plurality of call requests in the call queue. When one of the plurality of call information of one of the plurality of call requests in the call queue corresponds to the call information of the call request, the communication session is reestablished according to the call information between the hearing-impaired user and the hearing-capable user.

BRIEF DESCRIPTION OF THE SEVERAL VIEWS OF THE DRAWINGS

In the drawings, which illustrate what is currently considered to be the best mode for carrying out the invention.

DETAILED DESCRIPTION OF THE INVENTION

Figure 1:
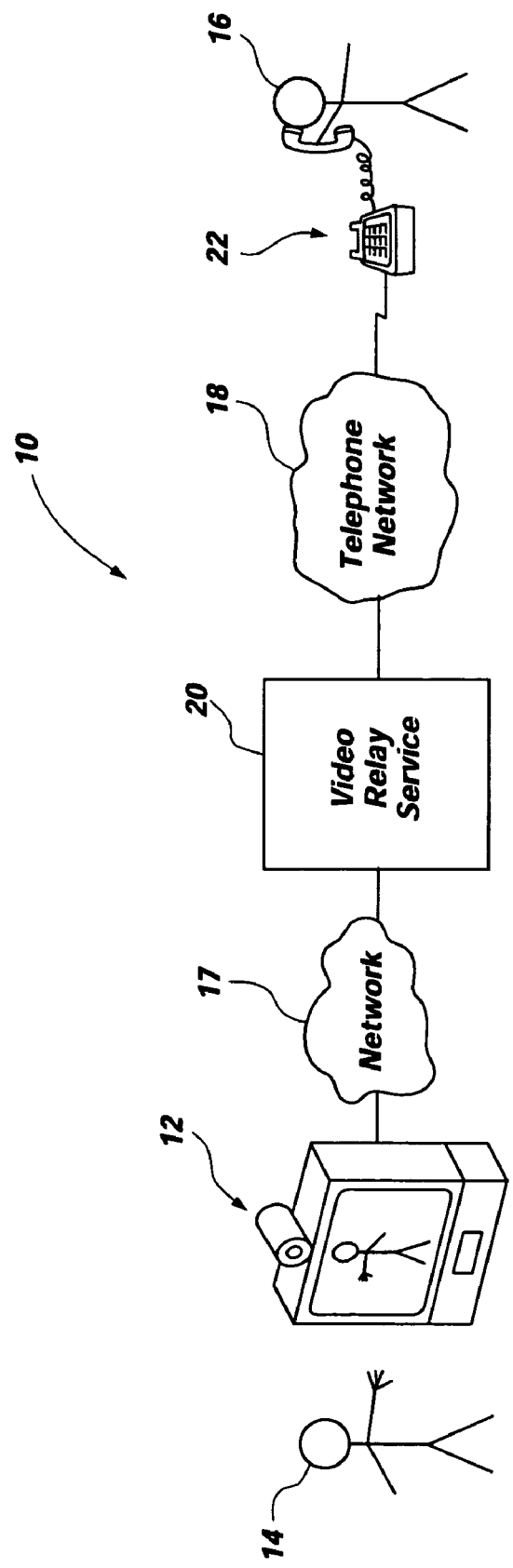
FIG. 1 illustrates a hearing-impaired communication system, in accordance with an embodiment of the present invention.

FIG. 1 illustrates a hearing-impaired communication system configured to facilitate a communication session between a hearing-impaired user and a hearing-capable user, in accordance with an embodiment of the present invention. A hearing-impaired communication system 10 enables a hearing-impaired user 14 to engage in conversation through a communication system with a hearing-capable user 16. A communication session between the users is facilitated through the use of various equipments, which are preferably coupled together using various networks including a telephone network, such as the Public Switch Telephone Network (PSTN).

To interface a hearing-impaired user into a generally voice-based communication system, interpretive services are employed allowing hearing-impaired users to communicate with an interpreter, namely through sign language. The sign language images are then translated by a video relay service 20 and when translated into voice information, are then forwarded over a voice-based communication connection to a hearing-capable user. One means for relaying the communicative expressions of a hearing-impaired user 14 within hearing-impaired communication system 10 incorporates a video phone 12 for capturing and displaying the communicative expressions exhibited by hearing-impaired user 14 and for displaying interpreted voice information originating from the hearing-capable user. The expressions, such as sign language and/or body language, may be interpreted or translated by video relay service 20. Hearing-capable user 16 interacts in a conventional manner with video relay service 20 through the use of a voice-based dialogue conveyed over a conventional voice phone 22. The various devices, such as video phone 12 and conventional voice phone 22 are coupled to video relay service 20 using one or more networks 17, 18. To facilitate the enhanced bandwidth needs of video phone 12, network 17 may be implemented as a high bandwidth network such as a DSL, Cable, Ethernet or other enhanced-bandwidth networking technology. Network 18 may be implemented according to the standards and bandwidth requirements of conventional voice phone 22.

Figure 2:
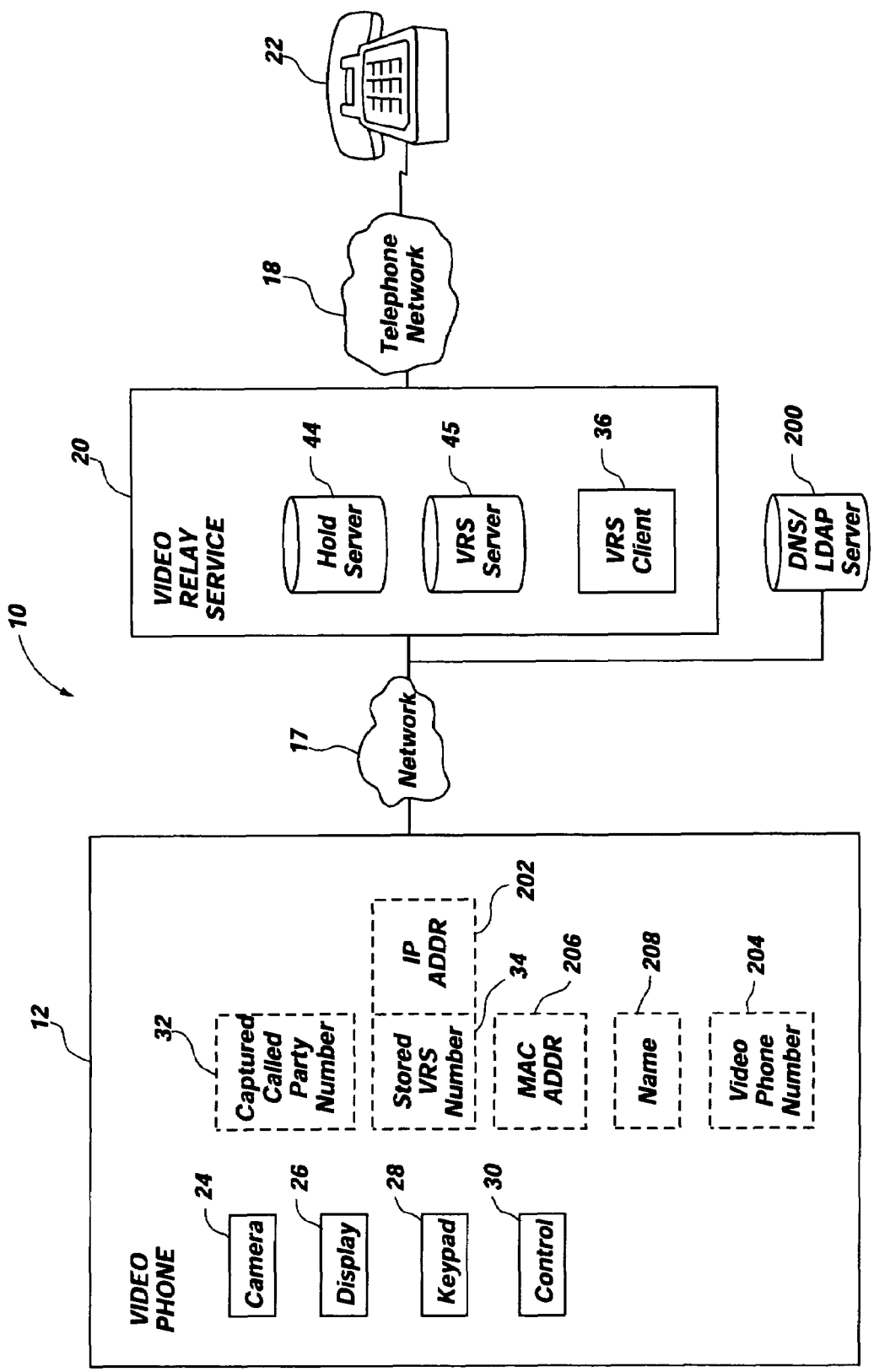
FIG. 2 illustrates a simplified block diagram of a hearing-impaired communication system, in accordance with an embodiment of the present invention.

FIG. 2 is a simplified diagram of a hearing-impaired communication, system 10, in accordance with an embodiment of the present invention. To facilitate the interaction with a hearing-impaired user, a video phone 12 includes video components such as a camera 24 for capturing the communicative expression of a hearing-impaired user and further includes a display or monitor 26 for displaying the communicative expressions originating from the hearing-capable user as interpreted by video relay service 20.

Video phone 12, in accordance with an embodiment of the present invention, further includes a keypad 28 or other data entry device configured to enable a hearing-impaired user to initiate a communication session in a conventional manner by entering the telephone number of the hearing-capable user, also known herein as a called party telephone number, which is captured and stored as captured called party number 32. In accordance with one embodiment of the present invention, the hearing-impaired user is able to interact with video phone 12 to initiate a phone call in a manner consistent with the interaction of a hearing-capable user initiating a phone call using a conventional telephone. Specifically, a hearing-impaired user enters, using an input device such as keypad 28, the called party number that is captured by a control process 30 and stored as a captured called party number 32.

Control process 30 retrieves a stored VRS number 34, which identifies a specific video relay service, and using a protocol, such as DNS or LDAP protocol, contacts a DNS or an LDAP server 200 and passes thereto a domain name or stored VRS number 34 and requests therefrom a corresponding IP address 202, which is returned to video phone 12. Video phone 12 thereafter initiates a call to video relay service 20 over network 17 using, for example, corresponding IP address 202 as returned from LDAP server 200. Control process 30 initiates a communication session over network 17 between video phone 12 and video relay service 20. In one embodiment of the present invention, the communication session between video phone 12 and video relay service 20 is more specifically initially connected to a hold server 44 within video relay service 20. Hold server 44 communicates with a VRS server 45 and when hold server 44 receives an inbound call in the form of a call request for the establishment of a communication session between video phone 12 and video relay service 20, hold server 44 notifies VRS server 45 of the intention to establish a communication session between video phone 12 and conventional voice phone 22. During the establishment of the communication session between video phone 12 and video relay service 20, video phone 12 passes a call request including calling information to hold server 44. The call request is subsequently passed to VRS server 45 including the calling information, which includes a video phone number 204, a MAC address 206, a name 208 and captured called party number 32. VRS server 45 includes and maintains a queue for one or more calls originating from video phones 12 seeking to establish or maintaining a communication session utilizing interpretive services as provided within VRS client 36.

Figure 3:
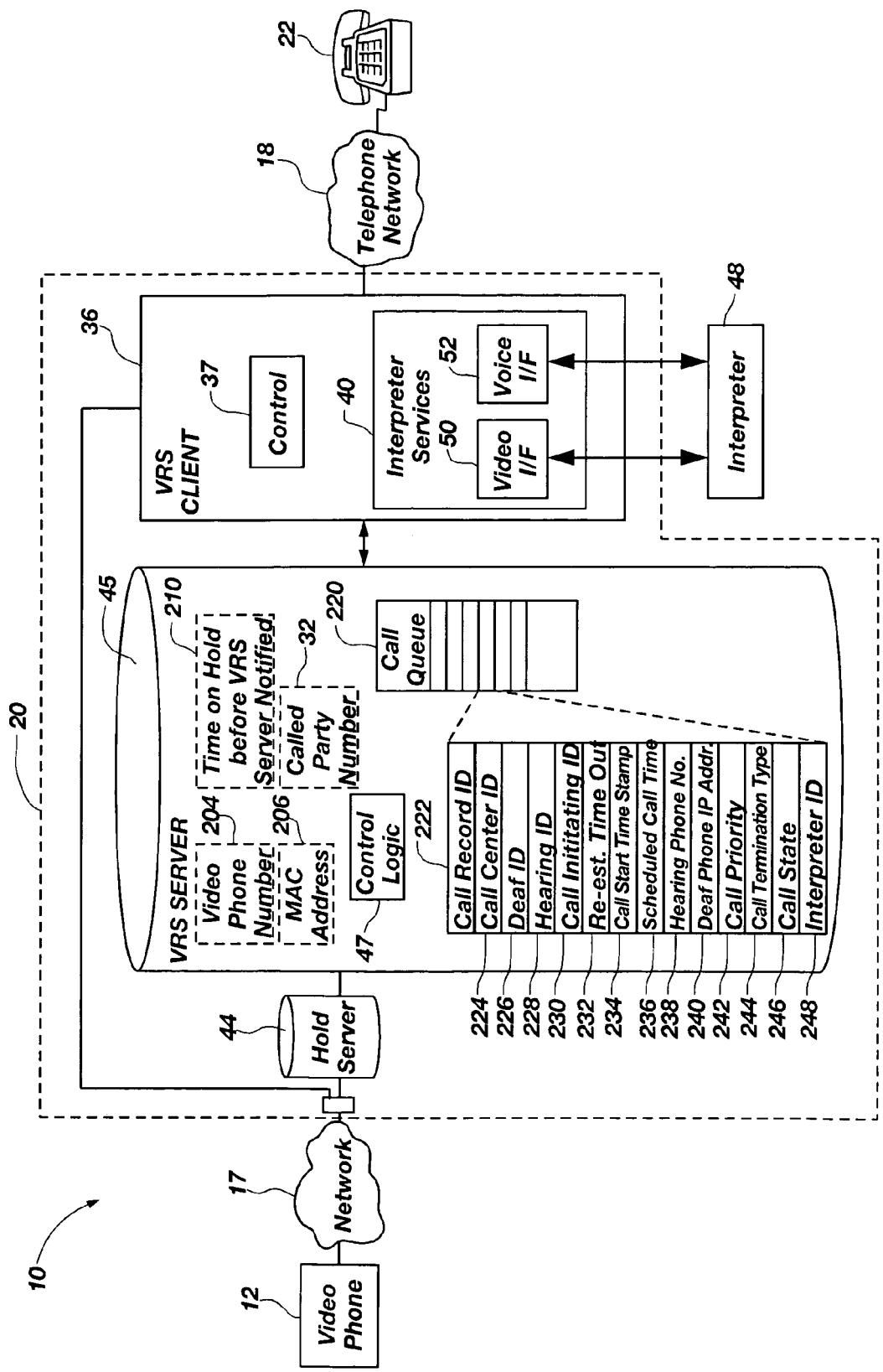
FIG. 3 is a functional block diagram of a video relay service configured for operation with a hearing-impaired communication system.

FIG. 3 is a functional block diagram of a hearing-impaired communication system 10 including a video relay system, configured in accordance with an embodiment of the present invention. The video phone 12 and voice phone 22 interact via video relay services 20 and as further coupled via network 17, 18. Video relay services 20, in addition to providing interconnection and interpretive services between a hearing-impaired user and a hearing-capable user, further provides reestablishment of a dropped or otherwise interrupted session, in accordance with an embodiment of the present invention. During the establishment of a connection between a video phone 12 and video relay services 20, call information including video phone number 204, MAC address 206, and captured called party number 32 are forwarded according to control logic 47 via hold server 44 to VRS server 45.

Additionally, when a connection with video phone 12 is received at hold server 44, hold server 44 begins timing the duration of the call on hold at hold server 44 prior to passing the call request and forwards to VRS server 45 a duration time on hold 210 before VRS server 45 is notified for use in prioritizing calls within call queue 220. When a call is received at VRS server 45, the call queue 220 is reprioritized or resorted, in accordance with the received call information.

Each call within call queue 220 is assigned a call record ID 222 that contains information regarding the specifics of the call for use in prioritizing or reattaching a call to a queue position and reestablishing a dropped or otherwise unintentionally terminated communication session. Call record ID 222 includes a call center ID 224, which may specify a specific one of a plurality of call centers providing interpretive services for servicing video relay service 20. Such identification enables the reestablishment of an unintentionally interrupted communication session.

Call record ID 222 further includes a deaf ID 226 and hearing ID 228 that provide an identification of the respective deaf and hearing users. Call record ID 222 further includes a call initiating ID 230 identifying which of the parties, the hearing-impaired or the hearing-capable party, initiated the call. Additionally, a reestablished time out 232 identifies a settable time out period within which an unintentionally terminated call may be reestablished without discarding such a call as an abandoned call. A call start time stamp 234 identifies the beginning time of an established session while a scheduled call time 236 identifies the requested start time for a previously scheduled call within video relay service 20. Call record ID 222 further includes a hearing phone number 238 and a deaf phone IP address 240 identifying the respective originating and destination devices.

A call priority 242 identifies emergency or otherwise higher priority devices. Call record ID 222 further includes a call termination type 244 identifying the termination status of a call, which may specify a requested normal type termination, or may be used for other testing or no answer type terminations. Call termination type 244 may be input and changed by an interpreter performing the interpretive services thereby identifying when a call terminates correctly or when an interruption occurs. A call state 246 identifies an ongoing status of a particular call including awaiting interpretive services state, call in process state and call terminated state. Call record ID 222 further includes an interpreter ID 248 utilized to store an identifier designating a specific interpreter performing interpretive services between the hearing-impaired user and the hearing-capable user. While call record ID as described herein includes various data elements, a subset or further augmentation of call record ID 222 is contemplated within the scope of the present invention.

Video relay service 20 further includes a VRS client 36, which provides interfaces to both the hearing-capable user at a voice phone 22 via network 18, and an interface with an interpreter 48 through interpreter services 40, which further includes video and voice interfaces 50, 52. The VRS client 36 notifies the VRS server 45 via control 37 when interpretive services are available. VRS server 45 thereafter services the next call request in the call queue 220. VRS client 36 then receives the call from the hold server 44 when the VRS server 45 determines which call request in the call queue 220 has priority and then instructs the hold server 44 to transfer the call to the VRS client 36.

Figure 4:
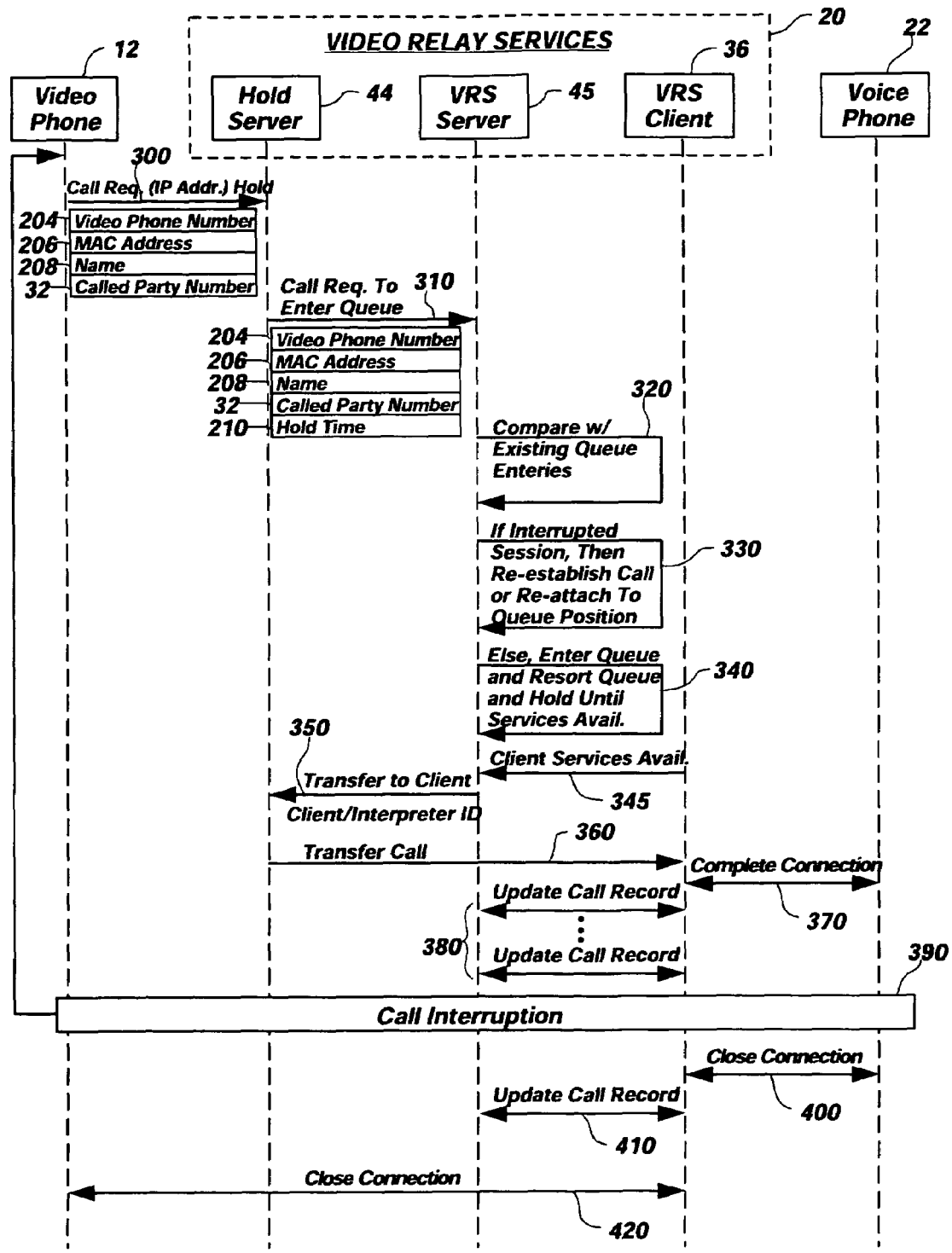
FIG. 4 is a flow diagram of call restoration within a video relay service, in accordance with an embodiment of the present invention.

FIG. 4 is a flow diagram illustrating the establishment of a communication session and recovery following a call interruption 390, in accordance with an embodiment of the present invention. In the present embodiment, a video phone 12 initiates a call 300 to video relay services 20 and passes thereto various call information, including video phone number 204, MAC address 206, a name 208 and captured called party number 32. A hold server 44 of video relay services 20 receives the initiated call and places the call on hold and issues a service's request to enter request 310 the call into a queue within VRS server 45. Information passed during enter request 310 includes video phone number 204, MAC address 206, a name 208, called captured called party number 32 as well as a duration time on hold 210 for delay encountered by the call while waiting on hold server 44.

VRS server 45 compares 320 the received information with any other entries within the call queue 220 (FIG. 3). If an entry within the call queue 220 corresponds to the received call information, an interrupted session or scheduled call is detected and, depending upon the call state, the call is either reestablished 330 if the communication session between the users was in progress or in the event that a connection was terminated while the user remained in the queue, then the user re-attaches 330 to the queue position previously held.

If a match corresponding to the received call information is not detected within the queue, then the new call request causes a call record ID 222 (FIG. 3) to be opened and populated according to the received call informations. The call is then entered 340 into the queue and the queue is resorted based upon all entries within the queue. The call remains on hold at the hold server 44 with the VRS server 45 maintaining the call queue 220 and updating the hold times and other respective a information within call record ID 222 (FIG. 3).

When interpretive resources become available 345, VRS server 45 issues a transfer request 350 designating a specific VRS client ID to which the hold server 44 should route the call corresponding to the call record ID on the top of call queue 220 (FIG. 3). Hold server 44 transfers 360 the call to VRS client 36 and VRS client 36 correspondingly completes 370 the connection with voice phone 22. During the established session, the call records are updated 380 to maintain information within call record ID 222 (FIG. 3) useful in the event of a call interruption 390.

If a call session is in progress and is subjected to a call interruption 390, processing reverts back to call initiation followed by subsequent detection of an interrupted session and the reestablishment of the call. When call interruption 390 is not present, VRS client 36 closes 400 connection with voice phone 22 and updates 410 the call record ID 222 (FIG. 3) to specify a proper termination or a termination type within the call record and then the connection is closed 420 with video phone 12.

Figure 5:
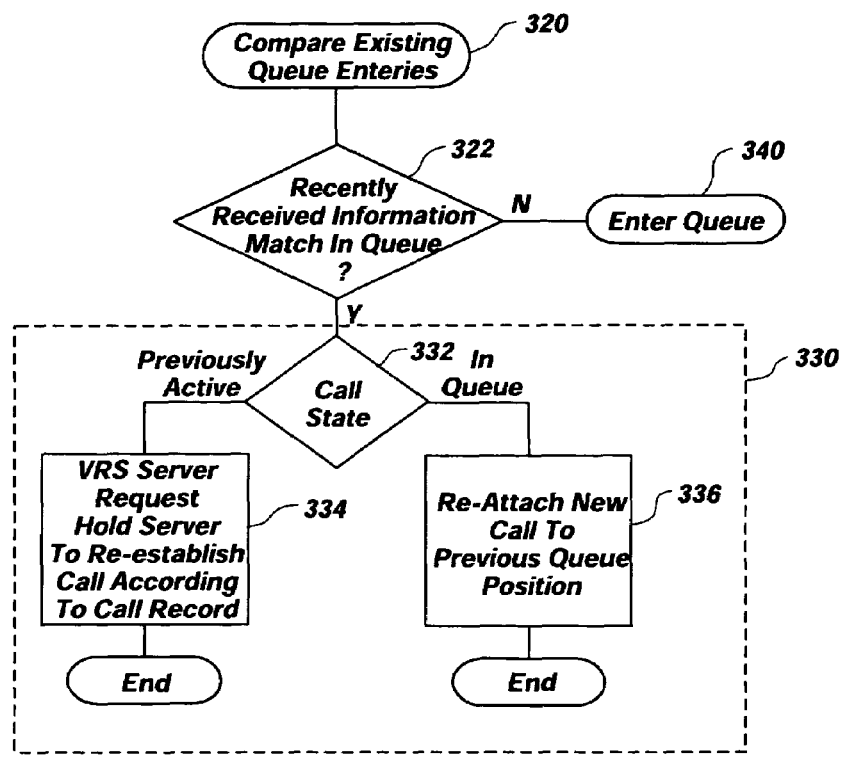
FIG. 5 is a flow diagram of processing a call request, in accordance with an embodiment of the present invention.

FIG. 5 is a flow diagram of comparison procedures for determining whether a received call was either in queue at the call queue or in progress during a session, in accordance with an embodiment of the present invention. When a call 300 is received and placed on holds (FIG. 4) at hold server 44 (FIG. 4), hold server 44 issues a call request 310 (FIG. 4) for the newly received call to enter the queue of VRS server 45 (FIG. 4). Once the call request is received at VRS server 45, the received information is compared 320 against each existing queue entry. In a matching or comparison process 322, when a match corresponding to the received information is not detected, the call is entered 340 into a call queue 220 (FIG. 3) with the entries within the call queue 220 being resorted according to criteria such as call priority (e.g., emergency calls) and cumulative hold times for each respective call.

When a match is detected, the call state is determined 332 in an attempt to evaluate whether the call was on hold within the call queue or whether the call was previously active prior to the call interruption. When the call state as determined within the corresponding call record ID 222 (FIG. 3) lists the call as being previously in the queue position, then the new call is re-attached 336 to the previously held queue position. When it is determined from the call state that the call was in progress or in session, the VRS server 45 (FIG. 4) requests 334 that the hold server reestablish the call with the retrieved VRS client as stored within the corresponding call record.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A video relay service (VRS) system, comprising:
   a VRS server including a call queue, the VRS server configured to receive at least one call request to establish a communication session between a hearing-impaired user and a hearing-capable user and maintain the call queue comprising a plurality of call requests, the at least one call request including call information regarding the hearing-impaired user and the hearing-capable user, the VRS server further including control logic configured to compare the at least one call request with the plurality of call requests to identify if the at least one call request corresponds to a previous call request corresponding to one of the plurality of call requests in the call queue to determine if the at least one call request is an interrupted call request or a new call request; and
   a VRS client application interactively coupled to the VRS server and configured to monitor availability of interpretive services and when the at least one call request corresponding to the hearing-impaired user and the hearing-capable user is sorted to a top of the call queue and the interpretive services are available, establishing the communication session via the interpretive services between the hearing-impaired user and the hearing-capable user.

2. The system of claim 1, wherein each of the plurality of call requests in the call queue includes a call record configured to maintain the call information and call status from corresponding ones of the plurality of call requests.

3. The system of claim 2, wherein the call status of the call record comprises a call state identifying a current status of the at least one call request.

4. The system of claim 3, wherein the call state is one of awaiting the interpretive services, call in process and call completed.

5. The system of claim 4, wherein the control logic is further configured to reestablish the communication session between the hearing-impaired user and the hearing-capable user when the at least one call request corresponds to the one of the plurality of call requests in the call queue and the call state of the one of the plurality of call requests is the call in process.

6. The system of claim 5, wherein the control logic is further configured to identify a specific interpreter used in the communication session prior to an interruption and request the specific interpreter when reestablishing the communication session.

7. The system of claim 5, wherein the control logic is further configured to determine a time duration of an interruption of the communication session and reestablish the communication session only when the time duration is less than a stored reestablish timeout.

8. The system of claim 4, wherein the control logic is further configured to re-attach the at least one call request to a corresponding one of the plurality of call requests in the call queue to restore a position in the call queue when the at least one call request corresponds to the one of the plurality of call requests in the call queue and the call state of the one of the plurality of call requests is awaiting the interpretive services.

9. The system of claim 1, wherein the call queue of the VRS server is further configured to maintain the plurality of call requests according to one or more criteria including call priority, call start time, scheduled call time and call state.

10. The system of claim 1, further comprising a hold server configured to receive and forward the plurality of call requests and hold a plurality of calls corresponding to the plurality of call requests until the VRS server identifies one of the plurality of calls for the hold server to connect with the VRS client application.

11. A method for electronic communication with a hearing-impaired user, comprising:
    receiving at least one call including a call request further including call information regarding the hearing-impaired user and a hearing-capable user;
    maintaining a call queue comprising a plurality of call requests corresponding to a plurality of calls, the call requests each including a call record comprising a call status of a corresponding call; and
    restoring the at least one call according to the call status in the call queue when the call information of the at least one call matches the call record of one of the plurality of call requests in the call queue.

12. The method of claim 11, wherein maintaining comprises:
    comparing the call information of the call request with the call record of each of the plurality of call requests in the call queue; and
    entering the call request in the call queue when a match with the call information of the call request is not found in the call queue.

13. The method of claims 11, wherein restoring includes re-attaching the call request to one of the plurality of call requests in the call queue when a match in the call queue is found and a call state is awaiting interpretive services.

14. The method of claim 11, wherein restoring includes reestablishing a communication session between the hearing-impaired user and the hearing-capable user when the at least one call request corresponds to the one of the plurality of call requests in the call queue and a call state of the one of the plurality of call requests is a call in process.

15. The method of claim 14, wherein reestablishing the communication session further comprises identifying a specific interpreter from the call record corresponding to the one of the plurality of call requests corresponding to the call request and requesting the specific interpreter during the communication session.

16. The method of claim 14, wherein reestablishing the communication session further comprises determining a time duration of an interruption of the communication session and reestablishing the communication session only when the time duration is less than a stored reestablish timeout.

17. A method for restoring an interrupted communication session between a hearing-impaired user and a hearing-capable user, comprising:
    receiving a call request including call information relating to the hearing-impaired user and the hearing-capable user;
    comparing the call information of the call request with a plurality of call information corresponding to a plurality of call requests in a call queue; and
    when one of the plurality of call information of one of the plurality of call requests in the call queue corresponds to the call information of the call request, reestablishing the interrupted communication session according to the one of the plurality of call information between the hearing-impaired user and the hearing-capable user.

18. The method of claim 17, wherein the call queue comprises a call record for each of the plurality of call requests, the call record comprising the call information including a call status identifying a call state of the plurality of call requests.

19. The method of claim 18, wherein reestablishing the interrupted communication session further comprises identifying a specific interpreter from the call record corresponding to the one of the plurality of call requests corresponding to the call request and requesting the specific interpreter from the interpretive services during the interrupted communication session.

20. The method of claim 15, wherein reestablishing the communication session further comprises determining a time duration of an interruption of the communication session and reestablishing the communication session only when the time duration is less than a stored reestablish timeout.

* * * * *